US 8,611,938 B2

(12) United States Patent
Da Silva et al.

(10) Patent No.: US 8,611,938 B2
(45) Date of Patent: Dec. 17, 2013

(54) CELLULAR BASESTATION

(75) Inventors: Cristavao Da Silva, Cambridge (GB); Andrea Giustina, Milan (IT); Oliver Bull, Wiltshire (GB); Housam Al Housami, Wiltshire (GB)

(73) Assignee: Ubiquisys Limited, Swindon (GB)

( * ) Notice: Subject to any disclaimer, the term of this patent is extended or adjusted under 35 U.S.C. 154(b) by 536 days.

(21) Appl. No.: 12/739,386

(22) PCT Filed: Oct. 27, 2008

(86) PCT No.: PCT/GB2008/003614
§ 371 (c)(1),
(2), (4) Date: Jun. 4, 2010

(87) PCT Pub. No.: WO2009/053710
PCT Pub. Date: Apr. 30, 2009

(65) Prior Publication Data
US 2010/0317386 A1 Dec. 16, 2010

(30) Foreign Application Priority Data

Oct. 26, 2007 (GB) .................................. 0721083.4

(51) Int. Cl.
*H04W 36/00* (2009.01)
(52) U.S. Cl.
USPC ......... 455/507; 455/437; 455/432.1; 455/436
(58) Field of Classification Search
USPC ............................. 455/434, 507, 432.1, 436
See application file for complete search history.

(56) References Cited

U.S. PATENT DOCUMENTS

| | | | | |
|---|---|---|---|---|
| 6,157,668 A * | 12/2000 | Gilhousen et al. | ............ | 375/130 |
| 6,289,005 B1 * | 9/2001 | Katz | .............................. | 370/328 |
| 6,587,457 B1 * | 7/2003 | Mikkonen | ...................... | 370/356 |
| 7,031,266 B1 * | 4/2006 | Patel et al. | ..................... | 370/254 |
| 7,505,426 B2 * | 3/2009 | Srikrishna et al. | ............ | 370/312 |
| 7,826,463 B2 * | 11/2010 | Patel et al. | ..................... | 370/401 |
| 7,979,074 B2 * | 7/2011 | Zhao et al. | ..................... | 455/447 |
| 8,179,838 B2 * | 5/2012 | Tang et al. | ..................... | 370/328 |
| 8,320,331 B2 * | 11/2012 | Vikberg et al. | ............... | 370/331 |
| 8,379,550 B2 * | 2/2013 | Semper | ......................... | 370/310 |
| 8,380,169 B2 * | 2/2013 | Gogic | ........................... | 455/411 |

(Continued)

FOREIGN PATENT DOCUMENTS

| | | |
|---|---|---|
| EP | 1 324 625 | 7/2003 |
| JP | 2005-109570 | 4/2005 |

(Continued)

OTHER PUBLICATIONS

GB First Examination Report dated Nov. 28, 2011, Application No. GB0721083.4.

(Continued)

*Primary Examiner* — Bobbak Safaipour
(74) *Attorney, Agent, or Firm* — Weaver Austin Villeneuve & Sampson LLP

(57) ABSTRACT

A cellular basestation, for example a femtocell basestation, is able to configure its cel reselection parameters, in order to define a desired transition zone, in which cell reselections may take place. Specifically, the basestation detects broadcast cell reselection parameters of at least one neighbouring basestation, and adapts its own broadcast cell reselection parameters in response to the detected broadcast parameters of the neighbouring basestation.

7 Claims, 4 Drawing Sheets

(56) References Cited

U.S. PATENT DOCUMENTS

| | | | |
|---|---|---|---|
| 8,417,250 B2* | 4/2013 | Bouguen et al. | 455/444 |
| 8,422,461 B2* | 4/2013 | Dickey | 370/332 |
| 2005/0070283 A1 | 3/2005 | Hashimoto et al. | |
| 2005/0148368 A1 | 7/2005 | Scheinert et al. | |
| 2006/0030324 A1 | 2/2006 | Hsu et al. | |
| 2007/0077928 A1 | 4/2007 | Kim et al. | |
| 2007/0097939 A1 | 5/2007 | Nylander | |
| 2008/0305835 A1* | 12/2008 | Johnstone et al. | 455/561 |
| 2009/0190550 A1* | 7/2009 | Giustina et al. | 370/331 |
| 2011/0039520 A1* | 2/2011 | Maida et al. | 455/411 |
| 2011/0039539 A1* | 2/2011 | Maida et al. | 455/422.1 |
| 2012/0108234 A1* | 5/2012 | Bao et al. | 455/432.1 |
| 2012/0208518 A1* | 8/2012 | Deng et al. | 455/419 |
| 2012/0225646 A1* | 9/2012 | Mochida et al. | 455/422.1 |
| 2012/0258711 A1* | 10/2012 | Bao et al. | 455/434 |
| 2012/0282931 A1* | 11/2012 | Giustina et al. | 455/437 |
| 2013/0034081 A1* | 2/2013 | Ban et al. | 370/331 |
| 2013/0064226 A1* | 3/2013 | Dinan | 370/332 |

FOREIGN PATENT DOCUMENTS

| | | |
|---|---|---|
| WO | WO 99/01005 | 1/1999 |
| WO | WO 00/16581 | 3/2000 |
| WO | WO 00/67511 | 11/2000 |
| WO | WO 2006/099238 | 9/2006 |

OTHER PUBLICATIONS

PCT International Search Report dated Feb. 4, 2009 issued in PCT/GB2008/003614.
UK Intellectual Property Office Search Report dated Feb. 21, 2008 issued in GB0721083.4.
ETSI Standards, "Universal Mobile Telecommunications System (UMTS); User Equipment (UE) procedures in idle mode and procedures for cell reselection in connected mode (3GPP TS 25.304 version 7.3.0 Release 7); ETSI TS 125 304," vol. 3-R2, No. V7.3.0; Oct. 1, 2007.
JP Office Action dated Feb. 1, 2013 issued in JP Application No. 2010-530546.

* cited by examiner

CELLULAR BASESTATION

This invention relates to a basestation for a cellular communication system, and in particular to a method and a system for providing a service through the basestation.

In a cellular communication system, a user equipment is able to move from the coverage area of one basestation into the coverage area of another basestation, and this is termed user mobility. Supporting mobility in cellular networks spans a number of concepts that guarantee the contiguity of operation for served mobiles. One of these concepts is the concept of cell selection and reselection, which defines how mobiles select their serving basestation and how they reselect to another basestation as they roam in the network. The aim of cell reselection is to guarantee ubiquity of service coverage of all mobiles in the network, whether connected or in idle mode. The second concept is the concept of handover, which defines how connected mobiles can successfully continue their connections as they move from one basestation to the next.

The present invention relates to cell reselection.

There are various mechanisms for determining when cell reselection should take place. For example, the cell reselection may take place when it is determined that the second basestation could provide a better signal quality than the first basestation.

However, it is recognized that, if a cell reselection were to take place whenever any other basestation were able to provide a better quality signal than the serving basestation, this could potentially mean that there would be a large number of reselections backwards and forwards between two basestations, as a user equipment moved around in the region between the basestations, or as the radio conditions vary.

Typically, therefore, a cell reselection only takes place if it would be expected to produce at least a certain minimum improvement in signal quality.

Femtocell basestations are now proposed, which can be purchased by consumers for use within their own homes or offices, using their own existing broadband internet connection to provide backhaul into the core network of the mobile network operator. In such situations, it may be advantageous for a mobile device to remain served by and connected to the femtocell basestation for as long as possible.

According to the present invention, there is provided a method of operating a basestation in a cellular communications network, the method comprising:
 detecting broadcast cell reselection parameters of at least one neighbouring basestation; and
 adapting broadcast cell reselection parameters of said basestation in response to said detected broadcast parameters of said at least one neighbouring basestation.

Figure 1:
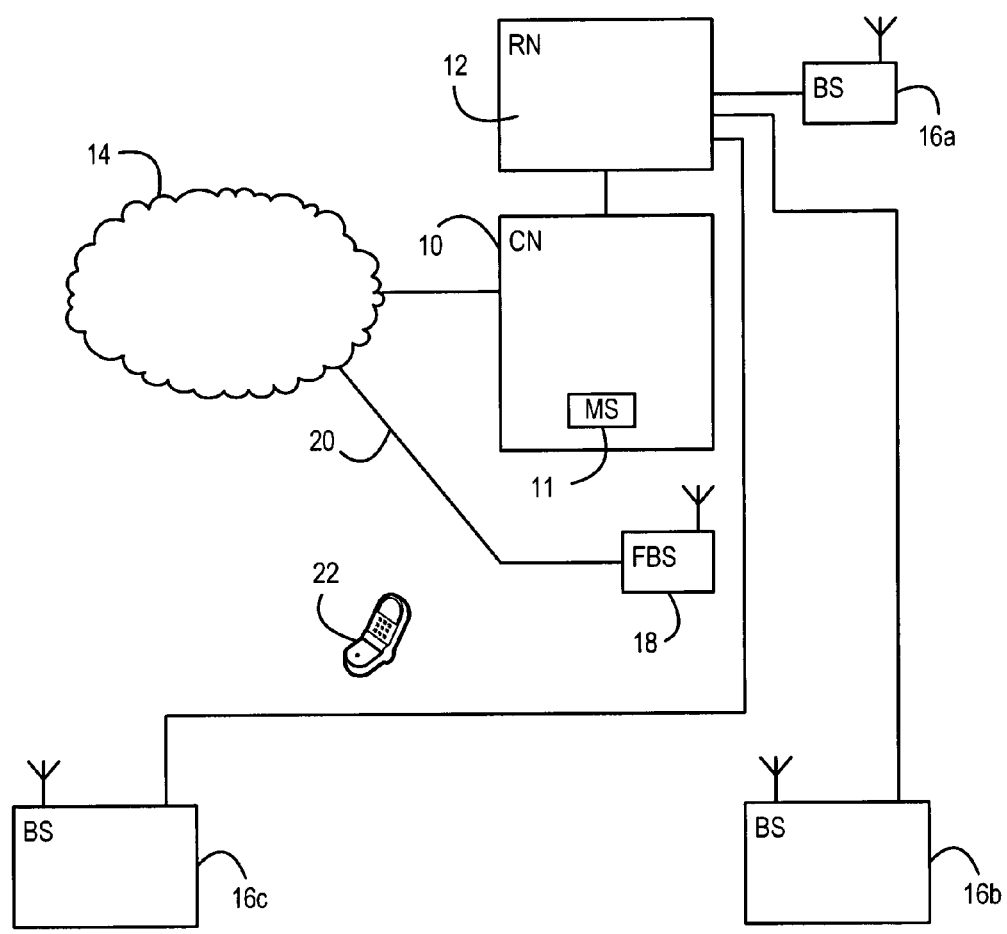
FIG. 1 is a block schematic diagram, illustrating a part of a cellular wireless communications network in accordance with an aspect of the present invention.

FIG. 1 illustrates a part of a cellular wireless communications network in accordance with an aspect of the present invention. Specifically, FIG. 1 shows a core network (CN) 10 and a radio network (RN) 12 of a cellular wireless communications network. These are generally conventional, and are illustrated and described herein only to the limited extent necessary for an understanding of the present invention.

Thus, the core network 10 has connections into the Public Switched Telephone Network (PSTN) (not shown) and into a packet data network, for example the internet 14. The radio network 12 may include, for example, a GSM radio network and/or a UMTS radio network, which are then generally conventional. As shown in FIG. 1, the radio network 12 has a number of basestations (BS) 16a, 16b, 16c connected thereto.

As will be recognized by the person skilled in the art, a typical radio network 12 will have many such basestations connected thereto. These basestations provide coverage over respective geographic areas, or cells, such that a service is available to subscribers. Often, there is a group of basestations that together provide coverage to the whole of the intended service area, while other basestations provide additional coverage to smaller areas within that intended service area, in particular to smaller areas where there is expected to be more demand for the service. The cells served by the basestations of the first group are then referred to as macrocells, while the smaller areas served by the additional basestations are referred to as microcells.

FIG. 1 also shows an additional basestation 18 that can be used to provide coverage over a very small area, for example within a single home or office building. This is referred to as a femtocell basestation (FBS). The femtocell basestation 18 is available for purchase by a customer from a general retail outlet and, after purchase, can be connected into the mobile network operator's core network 10 over the internet 14, by means of the customer's existing broadband internet connection 20. Thus, a user of a conventional mobile phone 22 can establish a connection through the femtocell basestation 18 with another device, in the same way that any other mobile phone can establish a connection through one of the other basestations of the mobile network operator's network, such as the basestations 16a, 16b, 16c.

As shown in FIG. 1, the core network 10 includes a management system (MS) 11, which is provided specifically for managing the femtocell basestation 18 and the other femtocell basestations that are active in the network.

As mentioned above, the macrocell basestations provide coverage to the whole of the intended service area including the location of the femtocell basestation 18 and the location of the mobile phone 22 while it is in the coverage area of the femtocell basestation 18.

This property is relevant for aspects of the present invention, as will be described in more detail below.

Figure 2:
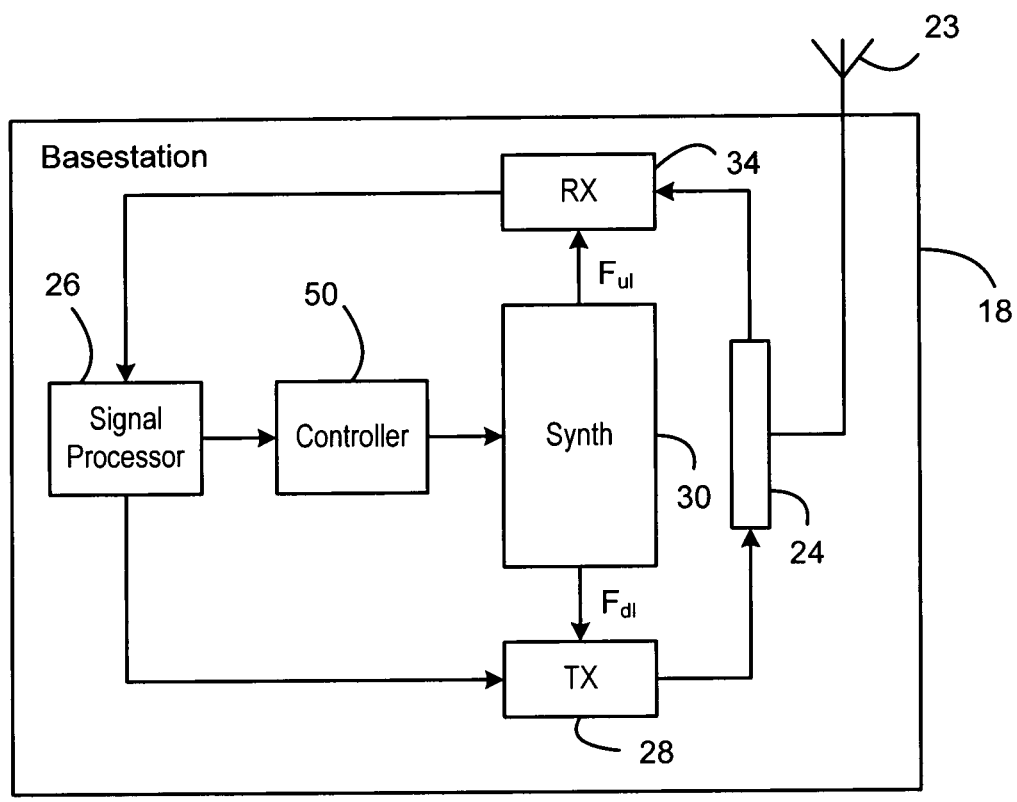
FIG. 2 is a block schematic diagram of a basestation in accordance with an aspect of the present invention.

FIG. 2 is a schematic diagram, illustrating in more detail the form of the basestation 18. The basestation has an antenna 23, connected to a duplexer 24. In the case where the cellular wireless network operates on the frequency division duplex principle, where each device can simultaneously transmit and receive radio frequency signals on a pair of frequencies having a known relationship, the duplexer is effectively a pair of matched filters that allow signals at the system downlink frequencies (that is, the transmit frequencies of the basestation 18) to be passed to the antenna 23, and allow signals at the system uplink frequencies (that is, the receive frequencies of the basestation 18) to be passed from the antenna 23.

In addition, in preferred embodiments of the present invention, the basestation 18 is also able to detect signals transmitted by other basestations, such as the basestations 16a, 16b, 16c, at allocated system downlink frequencies. For example, the basestation 18 may be provided with separate receiver circuitry, corresponding to the receiver circuitry conventionally found in a user device such as a mobile phone, or further means may be provided for allowing signals at the system downlink frequencies, received at the antenna 23, to be received in the basestation 18.

The basestation 18 includes a signal processor 26. In the case of signals for transmission by the basestation 18, the signal processor 26 receives the digital signals, converts them to the required format based on the communications standard used by the basestation, and passes the signals to transmit RF circuitry (TX) 28. As is generally conventional, the transmit RF circuitry 28 converts the signals to analog form, and upconverts them to the required radio frequency using an oscillator signal supplied by synthesizer circuitry 30 at a downlink frequency $F_{dl}$. The RF signals can then be passed through the duplexer 24 to the antenna 23 for transmission.

In the case of signals transmitted by a mobile device having a connection with the basestation 18, the signals are received at the antenna 23, and passed through the duplexer 24 to receive RF circuitry (RX) 34. As is generally conventional, the receive RF circuitry 34 downconverts the signals from the relevant radio frequency using an oscillator signal supplied by the synthesizer circuitry 30 at an uplink frequency $F_{ul}$, and converts them to digital form. The digital signals are then passed to the signal processor 26.

In accordance with the present invention, the basestation 18 uses information derived from signals transmitted by other network nodes, in particular the macrocell basestations 16*a*, 16*b*, 16*c* and/or any attached mobile phone 22 within the coverage area of the femtocell basestation 18, in order to optimize its own operation.

The basestation 18 operates under the control of a controller 50. In accordance with aspects of the invention, the controller 50 can set various broadcast parameters, and in particular can set such parameters based on measurements made on signals transmitted by other basestations.

Figure 3:
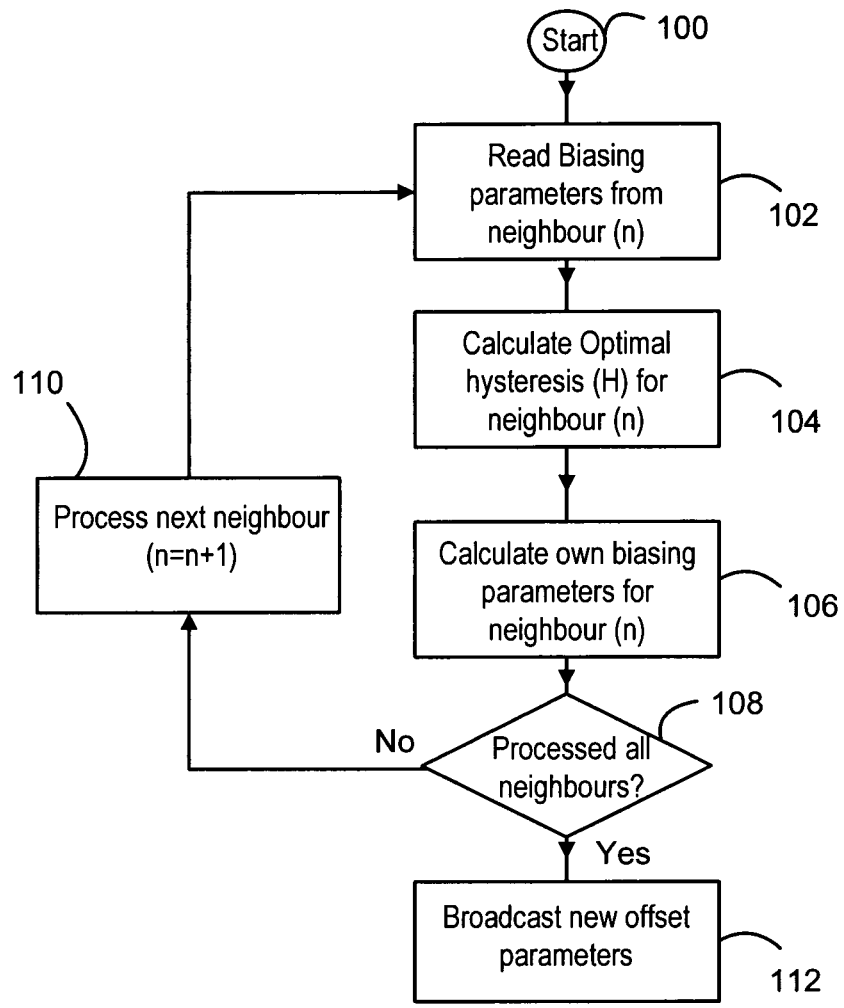
FIG. 3 is a flow chart, illustrating a first method in accordance with the present invention.

FIG. 3 is a flow chart, illustrating a first method in accordance with the invention.

In step 100, the process starts and, in step 102, the basestation 18 detects signals transmitted from other basestations in the network, in order to determine the risk of interference between such signals and its own transmissions. For example, the basestation 18 can detect the powers of signals being transmitted on the channels on which it is itself permitted to transmit. For a detected neighbour cell, the femtocell basestation 18 detects the biasing parameters.

In step 104, the basestation 18 calculates the optimal hysteresis value for that detected neighbour and then, in step 106, it calculates its own biasing parameters for that neighbour. For example, the basestation 18 sets values for the parameters Sintrasearch, Qhyst, Qqualmin and Qrxlevmin. In one embodiment, the basestation 18 sets values for a first outward cell reselection bias value and a second inward cell reselection bias value. The first bias value is a measure of an amount by which a signal strength of one of the basestations 16*a*, 16*b*, 16*c* must exceed the signal strength of the basestation 18, when a user equipment is moving out of the coverage area of the basestation 18, before a cell reselection takes place. Conversely, the second bias value is a measure of an amount by which a signal strength of the basestation 18 must exceed the signal strength of the serving basestation, when a user equipment is moving into the coverage area of the basestation 18, before a cell reselection takes place.

Preferably, the first bias value is set to a level higher than the second bias value. This has the effect that the user equipment spends as much time as possible connected to the basestation 18, rather than to any other basestation of the network. The difference between the bias values is termed the hysteresis value.

In step 108, it is determined if all of the neighbour cells have been processed in this way. If not, the process passes to step 100, in which a different neighbour is selected, and then returns to step 102. When all of the neighbour cells have been processed, the process passes to step 112, in which the new offset parameters are broadcast within the femtocell.

The process of calculating the hysteresis value and calculating the biasing parameters will now be described in more detail.

Different algorithms are used when reselecting cells according to whether the UE reselects from a UTRAN cell to another UTRAN cell, from a UTRAN cell to a GSM cell, or from a GSM cell to a UTRAN cell.

UTRAN to UTRAN and UTRAN to GSM Cell Reselection

The algorithm for cell reselection to be used by a UE in a UTRAN cell is defined in section 5.2.6.1 of 3GPP TS 25.304.

The serving cell (i.e. the cell which the UE has chosen to camp on) broadcasts neighbour cell lists (System Information Block (SIB) 11 for idle mode and SIB 12 for connected mode). The lists may include UTRAN intra-frequency neighbours, UTRAN inter-frequency neighbours or GSM neighbours. Only these cells are considered by the UE for the purpose of the cell reselection procedure.

In addition, the serving cell defines the minimum radio quality that a UTRAN cell must meet in order to be considered a suitable candidate for cell reselection, via the parameters Qqualmin, Qrxlevmin and UE_TXPWR_MAX_RACH broadcast in the serving cell's system information. A cell is deemed suitable (i.e. a valid candidate) if its CPICH EcNo and RSCP meet:

$$CPICH\_EcNo > Qqualmin; \text{ and}$$

$$CPICH\_RSCP > Qrxlevmin + max(UE\_TXPWR\_MAX\_RACH - P\_MAX, 0)$$

Where P_MAX is the maximum RF output power of the UE.

The serving cell also defines which RF quantity is used in the cell reselection algorithm when UTRAN candidate cells are concerned, i.e. CPICH EcNo or RSCP. For GSM cells RSSI is always used.

The cell ranking algorithm is different according to whether CPICH EcNo or RSCP is used.

If RSCP is used (for UMTS cells) then the serving cell has two types of parameters at its disposal to control UE reselection behaviour: Qhyst1,*s* and Qoffset1*s,n* (these parameters are broadcast in the serving cell's System Info). Qhyst1,*s* is a global (i.e. relative to all neighbour cells) positive (or null) bias in favour of the serving cell. Qoffset1*s,n* is a bias which may be positive or negative specific to neighbour cell n.

The serving cell ranking is defined as: Rs=CPICH RSCP+Qhyst1,*s*

Each neighbour cell ranking is defined as: Rn=CPICH RSCP (RSSI for GSM)−Qoffset1*s,n*

If a cell other than the serving cell is evaluated as the best ranking cell (highest R) for longer than a time interval Treselection (also broadcast by the serving cell) then the UE shall reselect to that cell If EcNo is used (for UMTS cells) then there may be more than one evaluation round and the serving cell has two additional types of parameters at its disposal to control UE reselection behaviour: Qhyst2,*s* and Qoffset2*s,n* (these parameters are also broadcast in the serving cell's System Info).

The UE will first perform an initial ranking as if RSCP was the used quantity (for UTRAN cells) in exactly the same way as described above (i.e. using Qhyst1,*s* and Qoffset1*s,n*). If the highest ranking cell (highest R) is a GSM cell then no additional evaluation round is performed and the UE will reselect to this cell if it continues to be the highest ranking cell for longer than a time interval Treselection.

If the highest ranking cell (highest R) is a UTRAN cell then the UE uses Qhyst2,$s$ and Qoffset2$s,n$ during a second evaluation round (amongst the UTRAN candidates only). Qhyst2,$s$ is a global (i.e. relative to all neighbour cells) positive (or null) bias in favour of the serving cell. Qoffset2$s,n$ is a bias which may be positive or negative specific to neighbour cell n.

The serving cell ranking is now defined as: Rs=CPICH EcNo+Qhyst2,$s$

Each UTRAN neighbour cell ranking is defined as: Rn=CPICH EcNo−Qoffset2$s,n$.

If a cell other than the serving cell is evaluated as the best ranking cell (highest R) for longer than a time interval Treselection (also broadcast by the serving cell) then the UE shall reselect to that cell.

GSM to UTRAN Cell Reselection

The algorithm for cell reselection from GSM to UTRAN, to be used by a UE in a GSM cell, is defined in section 6.6.5 of 3GPP TS 45.008.

The serving GSM cell informs the UE of UTRAN neighbours by broadcasting a 3G Cell Reselection list in its 2G System Information. Only these cells are considered by the UE for the purpose of the cell reselection procedure. In addition only suitable UTRAN cells are candidates for cell reselection. UTRAN cell suitability is defined by the target UTRAN cell itself and not by any criteria broadcast by the serving GSM cell, i.e. the UE must decode the Qqualmin, Qrxlevmin and UE_TXPWR_MAX_RACH broadcast in the target cell's 3G system information.

The serving GSM cell has two parameters at its disposal to control GSM to UTRAN cell reselection. These parameters are broadcast in the cell's 2G System Information: FDD_Qmin and XXX_Qoffset The UE will reselect to a suitable UTRAN cell if the following criteria are all met for a period of 5 s:

- Its measured CPICH RSCP value exceeds the value of RLA_C (average RSSI) for the serving cell and all of the suitable non-serving GSM cells by the value XXX_Qoffset;
- Its measured CPICH EcNo value is equal or greater than the value FDD_Qmin
- Its measured CPICH RSCP value is equal to or greater than Qrxlevmin+max(UE_TXPWR_MAX_RACH−P_MAX,0)+10 dB (if the UE has managed to decode these quantities, otherwise the criterion is not used).

According to one embodiment of the present invention, for each surrounding UTRAN cell that lists the femto cell served by the femtocell basestation 18 in its neighbour lists for cell reselection (SIB 11 and SIB 12), the femtocell basestation 18 will read the cell reselection parameters affecting reselection from the UTRAN cell to the femtocell, i.e. the global parameters Qhyst1,$s$ and Qhyst2,$s$ and the parameters Qoffset1$s,n$ (Qoffset1$s,ap$) and Qoffset2$s$ (Qoffset2$s,ap$) specific to the femtocell. The femtocell basestation 18 will then compute the bias used by each UTRAN cell relative to the femtocell. The computation will depend on the cell reselection quantity (for UTRAN cells) used in that cell, i.e. CPICH RSCP or EcNo. It is assumed here that all surrounding cells will be using the same quantity.

- If the quantity used is CPICH RSCP then the bias for reselection from the UTRAN cell to the femtocell (referred to as Bias (3G→AP)) is computed as Bias(3G→AP)=Qhyst1,$s$+Qoffset1$s,ap$

- If the quantity used is CPICH EcNo then the bias is computed as

Bias(3G→AP)=Qhyst2,$s$+Qoffset2$s,ap$

For each surrounding GSM cell that lists the femto cell served by the femtocell basestation 18 in its 3G neighbour lists for cell reselection (SI2quater and/or SI2ter messages), the femtocell basestation 18 will read the cell reselection bias parameter affecting reselection from the GSM cell to the femtocell, i.e. the global parameter XXX_Qoffset. The femtocell basestation 18 will consider that as the bias used by the GSM cell relative to the femtocell, that is:

Bias(2G→AP)=XXX_Qoffset

Setting Cell Reselection Bias Values

For each of the above cells that the femtocell basestation 18 decides to include in its own neighbour lists for cell reselection (SIB 11 and SIB 12), the femtocell basestation 18 sets its own bias parameters Qhyst1,$s$; Qhyst2,$s$; Qoffset1$s,n$; and Qoffset2$s,n$ taking into account the bias in the reverse direction.

Figure 4:
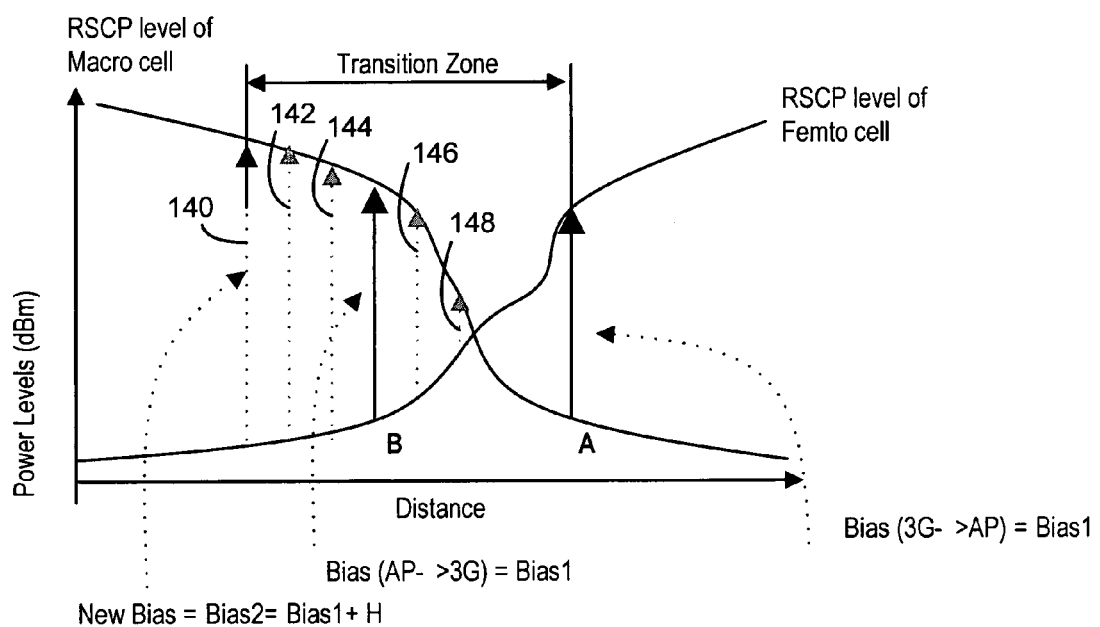
FIG. 4 is a first diagram showing signal strengths plotted against position of a user equipment in a first situation.

FIG. 4 assists in explaining the bias effect on cell selection and re-selection. In FIG. 4, the position along the horizontal "distance" axis represents the position of a user equipment (UE), and increasing distance represents the UE moving further away from a macrocell basestation and towards the femtocell basestation 18. FIG. 4 then shows the measured macrocell and femtocell power levels at various positions of the UE.

Firstly, we consider the situation where the UE is initially at a position near the macrocell basestation, i.e. at the left of FIG. 4, and camped-on the macrocell. As the mobile moves away from the macrocell towards the femtocell (from the left to the right of the diagram) the RSCP level of the macro cell gradually drops, while the RSCP level of the femtocell gradually increases. At point A, where the femtocell RSCP level is stronger than the macrocell RSCP by the bias amount discussed above, i.e. Bias (3G→AP)=Qhyst1,$s$+Qoffset1$s,ap$, the mobile initiates a cell reselection to the femtocell. As shown in FIG. 4, this bias value Bias (3G→AP) is set to a value Bias1.

When the mobile moves in the opposite direction from the femtocell towards the macrocell (from the right side of the diagram to the left side), the RSCP level of the macro cell gradually increases, while the RSCP level of the femtocell gradually decreases.

When the mobile reaches the point B at which the macrocell RSCP is stronger than the femtocell RSCP level by the bias amount Bias (AP→3G) the mobile initiates a cell reselection to the macrocell. This bias amount Bias (AP→3G) is defined as:

Bias(AP→3G)=Qhyst1,$s$+Qoffset1$s$,macro

As shown in FIG. 4, this bias amount Bias (AP→3G) can be set equal to the value Bias1 of the bias value Bias (3G→AP).

However, the value of the bias amount Bias (AP→3G), can be manipulated by changing the Qhyst1,$s$ and Qoffset1$s$, macro parameters broadcast by the femtocell, in order to vary the distance at which cell reselection to the macrocell will occur.

Specifically, by forming the bias amount Bias (AP→3G) by adding a hysteresis value, H, to the bias amount Bias (3G→AP), the bias in the outward direction can be manipulated to vary the distance at which cell reselection to the macrocell is likely to occur.

Thus, FIG. 4 also shows a situation where the bias amount Bias (AP→3G), Bias2, is set such that Bias2=Bias1+H.

As shown by the arrows 140, 142 and 144, H can advantageously be set to a positive value, such that the distance at which cell reselection occurs is increased. However, as shown by the arrows 146 and 148, H can alternatively be set to a negative value, such that the distance at which cell reselection occurs is decreased.

As mentioned above, the parameter values Qhyst1,*s* and Qoffset1*s*,macro are set on the basis of the required hysteresis value, so that the cell reselection to the macrocell is likely to occur at a desirable point as indicated in FIG. 4. Of course, the same reasoning applies when the cell reselection criterion is based in CPICH EcNo, in which case the relevant parameter values are (Qhyst2,*s*) and (Qoffset2*s*,*n*).

EXAMPLE 1

An embodiment of the invention will now be described, with reference to a situation in which the femtocell basestation 18 detects the four cells below, which list the femtocell basestation 18 as a neighbour for cell reselection, and detects the listed parameter value broadcast by those cells.
UTRAN cell 1: Qhyst1,*s*=2 dB; Qoffset1*s*,*ap*=0 dB;
UTRAN cell 2: Qhyst1,*s*=2 dB; Qoffset1*s*,*ap*=2 dB;
GSM cell 1: XXX Qoffset=2 dB;
GSM cell 2: XXX_Qoffset=3 dB.

The bias in going from each cell to the femtocell basestation 18 is then calculated as follows:

| Neighbour cell | Bias (Neighbour → AP) |
|---|---|
| UTRAN cell 1 | 2 + 0 = 2 dB |
| UTRAN cell 2 | 2 + 2 = 4 dB |
| GSM cell 1 | 2 dB |
| GSM cell 2 | 3 dB |

If, for example, the femtocell basestation decides to create a larger transition zone by using a hysteresis value of 2 dB, it can do so by modifying the setting of the cell reselection bias parameters that it broadcasts in its 3G System Information.

There are several combinations of the relevant parameters that meet this objective. One possible combination, presented here simply for the purposes of an illustrative example, is:
Qhyst1*s*=2 dB
UTRAN cell 1: Qhyst1*s*, Ucell1=2 dB;
UTRAN cell 2: Qhyst1*s*, cell2=4 dB;
GSM cell 1: Qhyst1*s*, Gcell1=6 dB;
GSM cell 2: Qhyst1*s*, Gcell2=7 dB.

Of course, this is just an example. The femto cell bias parameters may be set to create an arbitrary hysteresis zone around the femtocell basestation 18. Further, the transition zone may not be uniform in size but may vary from neighbour cell to neighbour cell.

The invention has been described here with reference to an automatic configuration by the femtocell basestation of the relevant parameters, which clearly has some advantages for ease of operation. However, the cell reselection parameters may also be set in other ways in accordance with the teaching herein.

The invention claimed is:

1. A method of operating a femtocell basestation in a cellular communications network, the method comprising:
   detecting broadcast cell reselection parameters of at least one neighbouring macrocell basestation, wherein the broadcast cell reselection parameters of the neighbouring macrocell basestation define a first bias in favour of the at least one neighbouring basestation for use when performing a cell reselection from the macrocell to the femtocell; and
   adapting broadcast cell reselection parameters of said femtocell basestation in response to said detected broadcast cell reselection parameters of said at least one neighbouring macrocell basestation, wherein the broadcast cell reselection parameters of said femtocell basestation define a second bias in favour of said femtocell basestation for use when performing a cell reselection from the femtocell to the macrocell, wherein the second bias is adapted relative to said first bias such that the second bias is higher than the first bias.

2. A method as claimed in claim 1, wherein said second bias is adapted such that the sum of said first bias and said second bias is a predetermined value.

3. A method as claimed in claim 1, wherein said detecting step comprises detecting the respective broadcast cell reselection parameters of a plurality of neighbouring macrocell basestations, and said adapting step comprises adapting the broadcast parameters of said femtocell basestation relative to the respective detected broadcast cell reselection parameters of the plurality of neighbouring macrocell basestations.

4. A method as claimed in claim 3, wherein said respective broadcast parameters of said plurality of neighbouring macrocell basestations define respective first biases in favour of each of the plurality of neighbouring macrocell basestations over said femtocell basestation, and said broadcast parameters of said femtocell basestation define respective second biases in favour of said femtocell basestation over each of said plurality of neighbouring macrocell basestations.

5. A method as claimed in claim 4, wherein said second biases are adapted relative to said first biases.

6. A method as claimed in claim 5, wherein said second biases are adapted such that a sum of each said first bias with its respective said second bias is a predetermined value.

7. A femtocell basestation, for use in a cellular communications network, the femtocell basestation being adapted to:
   detect broadcast cell reselection parameters of at least one neighbouring macrocell basestation, wherein the broadcast cell reselection parameters of the neighbouring macrocell basestation define a first bias in favour of the at least one neighbouring basestation for use when performing a cell reselection from the macrocell to the femtocell;
   adapt its own cell reselection parameters in response to said detected broadcast cell reselection parameters of said at least one neighbouring macrocell basestation, wherein the broadcast cell reselection parameters of said femtocell basestation define a second bias in favour of said femtocell basestation for use when performing a cell reselection from the femtocell to the macrocell, wherein the second bias is adapted relative to said first bias such that the second bias is higher than the first bias; and
   broadcast the adapted cell reselection parameters.

* * * * *